Aug. 11, 1931.  I. L. NICKERSON  1,818,348
REFRIGERATING APPARATUS
Filed Sept. 30, 1926  2 Sheets-Sheet 1

INVENTOR
Ira L. Nickerson

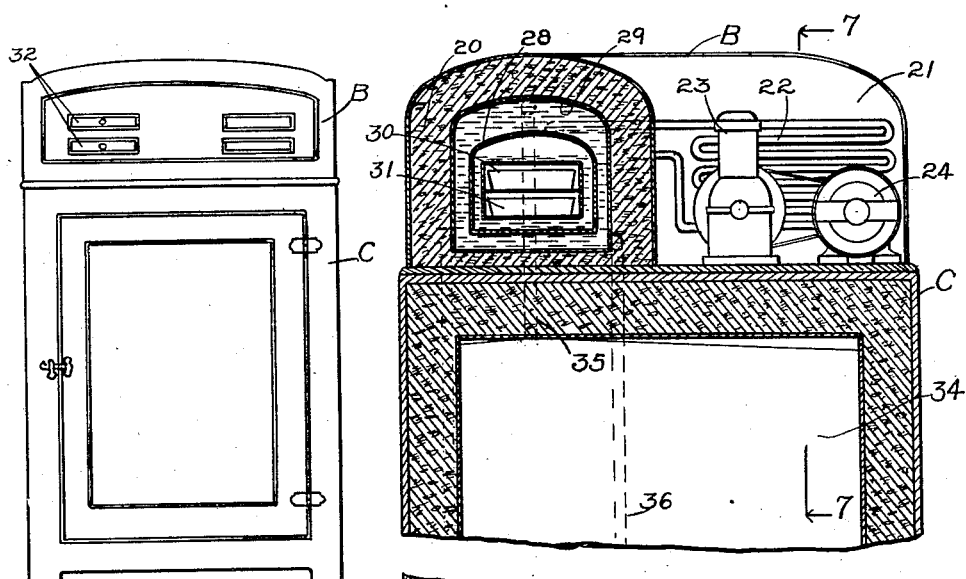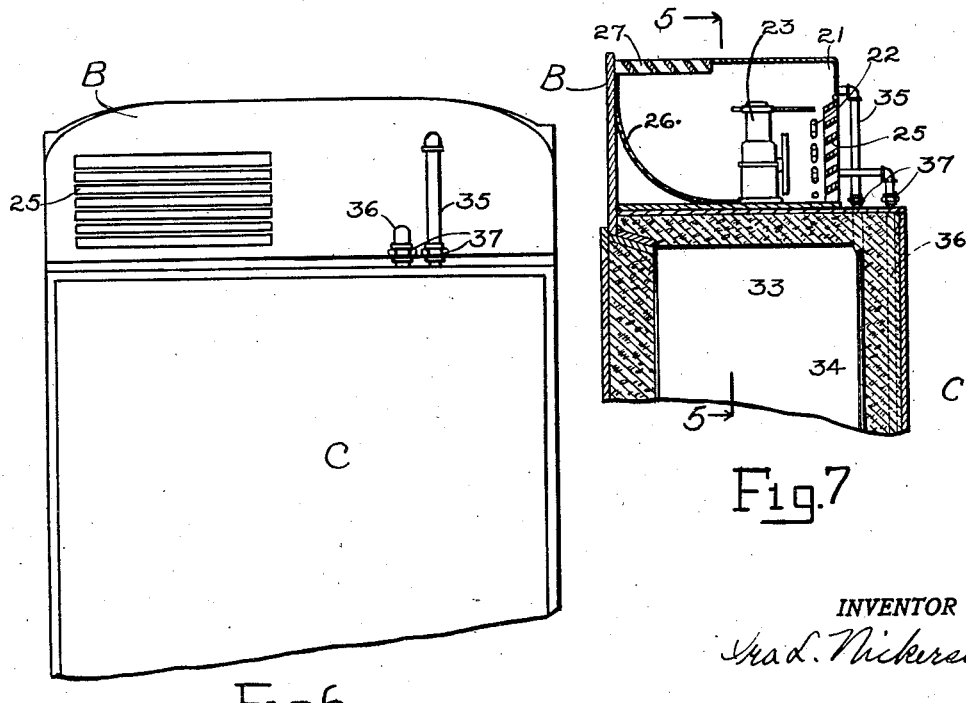

Patented Aug. 11, 1931

1,818,348

UNITED STATES PATENT OFFICE

IRA L. NICKERSON, OF SOUND BEACH, CONNECTICUT, ASSIGNOR TO CHICAGO PNEUMATIC TOOL COMPANY, OF NEW YORK, N. Y., A CORPORATION OF NEW JERSEY

REFRIGERATING APPARATUS

Application filed September 30, 1926. Serial No. 138,595.

The present invention relates to systems for producing heat transforming effects. It particularly concerns the artificial production of refrigeration with special reference to refrigerating apparatus utilizing some means for the so-called "storing" of cold, such a tank of liquid having a low freezing point as brine. The invention has particular application and adaptation to household refrigerating apparatus and cabinets, although by no means confined thereto.

Among the objects of the invention are to devise apparatus of the described type which will render available for useful storage practically the entire space within a refrigerating chamber or compartment, to utilize the low freezing liquid for the extraction of heat from such chamber or compartment, to provide a complete refrigerating apparatus unit including a freezing compartment for liquid, to adapt old as well as new cabinets to the use of such units, to facilitate the servicing of refrigerating outfits, to effect economies in the manufacture, assembly, operation, and servicing of such outfits, and in general to improve prior apparatus and construction in the interests of more efficient and satisfactory service.

In order to illustrate the invention concrete embodiments thereof are shown in the accompanying drawings, in which:

Fig. 4 is a side elevational view of a modified form of the invention;

Fig. 5 is a transverse vertical sectional view on an enlarged scale substantially on the line 5—5 of Fig. 7;

Fig. 6 is a fragmentary rear elevational view of the parts shown in Fig. 4; and

Fig. 7 is a sectional view substantially on the line 7—7 of Fig. 5.

Figure 1:
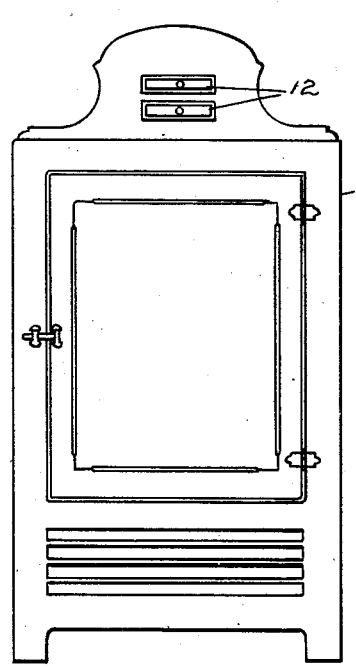
Fig. 1 is a front elevational view of one form of refrigerating outfit.
Figure 2:
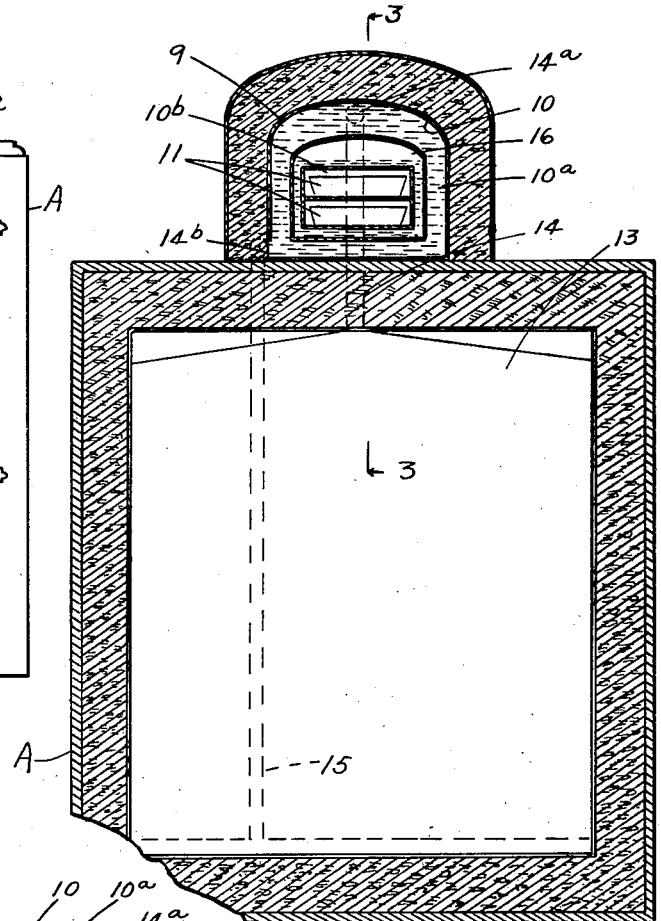
Fig. 2 is a fragmentary transverse sectional view of the same outfit on an enlarged scale, substantially on the line 2—2 of Fig. 3.
Figure 3:
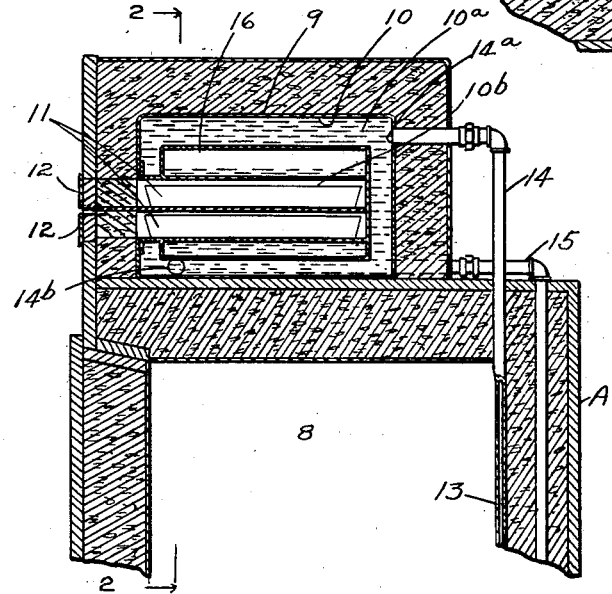
Fig. 3 is a fragmentary vertical sectional view on the line 3—3 of Fig. 2.

The embodiment of the invention shown in Figs. 1 to 3 comprises a complete refrigerating outfit suitable for household use mounted in a cabinet A containing separate heat insulated compartments 8 and 9. Compartment 9 is the smaller of the two and disposed at a higher level than compartment 8, as upon the top or in the upper part of cabinet A, as shown. Compartment 9 is arranged for the freezing of liquids and contains a tank 10 substantially filling compartment 9 and arranged to contain a low freezing liquid 10a, such as a brine solution. Tank 10 provides a chamber 10b within which the liquids to be frozen are disposed, as in trays 11 arranged to be inserted into and removed from chamber 10b through openings closed by doors or slides 12. The invention contemplates the use of brine 10a as the medium for removing heat from the large or food storage compartment 8. To this end a container 13 of any desired size and shape is vertically disposed within compartment 8. The top of the container is connected by a pipe 14 to the top of the brine tank 10. A similar connection 15 extends from the bottom of container 13 to the bottom of tank 10, the openings 14a and 14b respectively, for these pipes being at opposite ends of tank 10. Container 13 preferably takes the form of a thin flat receptacle of small cubical content relative to tank 10 placed against one of the walls of the compartment as the back, so that practically the entire space within compartment 8 is available for storage.

Suitable means are provided for lowering the temperature of the low freezing liquid 10a. To this end an evaporator element 16 containing a suitable volatile liquid and forming a part of a closed cycle refrigerating system is provided in thermal contact with tank 10. Any conventional or known form of refrigerating apparatus (not shown) may be utilized to operate and control the vaporizing of the refrigerant in element 16, and the apparatus may be disposed in accordance with the usual practice in a compartment provided in the lower part of cabinet A or in any other suitable place. By preference element 16 is disposed within tank 10 to line chamber 10b so that the evaporating refrigerant withdraws heat on the one hand from the trays 11 of liquid and on the other hand from the body of brine 10a which immediately surrounds the element.

By withdrawing heat from the upper part of the brine system and by connecting the top and bottom of container 13 to the top and bottom respectively of the brine storage tank 10, it is apparent that the absorption of heat by the thin film of brine in the extended container 13 will create an active circulation of brine upwardly in container 13 through connection 14 to the top of the brine tank where the warm brine loses its heat through the action of evaporator element 16 and moves as cold brine to the bottom of tank 10 whence it passes through connection 15 to the bottom of container 13, the circulation being on the thermo-siphon principle. To facilitate the circulation of the brine and to prevent the formation of dead pockets, the top of container 13 is preferably formed so as to incline upwardly to pipe 14 as shown.

The embodiment of the invention shown in Figs. 4 to 7 utilizes the brine system including a storage tank for extracting heat from a large compartment after the manner described in relation to the embodiment shown in Figs. 1 to 3, but provides more convenient means for servicing the refrigerating apparatus and provides convenient and practical means for adapting ordinary ice refrigerator cabinets to mechanical refrigeration. A portable self-contained refrigerating unit B is provided adapted to be placed above or upon a cabinet C which may be of the old ice type or especially built for the unit. The unit contains two compartments, 20 and 21, the first insulated against heat for the freezing of liquids, and the second for the apparatus or mechanical parts of the refrigerating means proper, such as, the condenser 22, the compressor 23 and the motor 24. Compartment 21 may have openings 25 at the back to admit air drawn in by a fan on motor 24 for removing heat from condenser 22 and compressor 23, the air being directed upwardly by a deflector 26 through openings 27 in the top of the apparatus compartment. The evaporator element 28 is disposed as in the first form of the invention within the brine tank 29 which fills the freezing compartment, a central chamber 30 being provided for the ice trays 31 which are reached through doors or slides 32. The food storage compartment 33 of cabinet C has vertically disposed therein a brine container 34 similar to that shown in the first modification and having a pipe 35 leading from its top to the top of tank 29 and another pipe 36 from its bottom to the bottom of the tank 29 to insure a thermo-siphon circulation of the brine. Pipes 35 and 36 have detachable unions or joints 37 enabling the refrigerating unit B to be quickly attached to or detached from cabinet C.

By using self-contained units such as B, the servicing of the apparatus is greatly simplified and expedited since it is not necessary to open up the refrigerating system proper at all but only the brine system. The opening of the brine system is a simple matter involving no danger or unpleasant consequences to either persons or property. If the apparatus unit fails, the brine system is drained, the pipe connections 35 and 36 are broken at the detachable connections 37, the defective unit B is removed and a new unit B substituted. The brine system is connected up at 37 and on pouring back the brine, the apparatus can be immediately put into operation. The defective unit can then be carried away to the shop for repairs and brought back and reinstalled in the same convenient manner.

In adapting ice refrigerator cabinets to mechanical refrigeration in accordance with the present invention, it is only necessary to place within the old cabinet a brine container such as 13 or 34. This container may be of any size or shape and may be arranged to form a vertical partition within the food compartment if it is not easy to mount it against one of the walls. Holes are bored through the walls of the cabinet for the pipe connections leading from the top and the bottom of the container. The refrigerating unit B is then mounted over the refrigerator cabinet or upon it and as soon as the pipe connections to the brine tank are made and the brine system filled, the apparatus is ready for operation.

While preferred forms of the invention have been herein shown and described, it is to be understood that the invention is not limited to the specific details thereof, but covers all changes, modifications and adaptations within the scope of the appended claims.

I claim as my invention:

1. The combination with a cabinet providing an insulated refrigerating compartment and a thin flat container of substantial extent within said compartment adjacent one of the walls, of a portable self-contained refrigerating unit arranged to be placed above said cabinet, said unit comprising refrigerating apparatus of the closed cycle type and a tank of low freezing liquid from which heat is extracted by said apparatus, and detachable connections extending from said container and from said tank arranged to utilize said tank for extracting heat from said compartment and permitting removal of said unit without distributing the contents of said cabinet.

2. The combination with a cabinet providing an insulated refrigerating compartment and a hollow container presenting an extended surface area but of small cubical content within said compartment, of a portable refrigerating unit arranged to be placed upon said cabinet, said unit having an insulated compartment for the freezing of liquids, a brine tank substantially filling said last-named compartment and providing a chamber for liquids to be frozen, self-contained mechanically operated refrigerating apparatus of the closed cycle type including an evaporator element in thermal contact with said tank to extract heat from the latter, and detachable means for connecting said tank to said container and arranged to effect circulation of the brine by gravity so as to utilize the brine to extract heat from said cabinet compartment, said detachable means permitting the entire removal of said unit or an exchange of units without disturbing the interior of said cabinet.

3. The combination with a cabinet providing an insulated refrigerating compartment and a hollow container within said compartment of a portable refrigerating unit arranged to be placed upon said cabinet, said unit having an insulated compartment for the freezing of liquids, a brine tank substantially filling said last-named compartment and providing a chamber for the liquids to be frozen, refrigerating apparatus of the closed cycle type on said unit including an evaporator element in thermal contact with said tank to remove heat from the latter, and detachable means for connecting said tank to said container and arranged to effect circulation of the brine so as to utilize the brine to extract heat from said cabinet compartment.

4. The combination with a cabinet providing an insulated refrigerating compartment and a hollow container within said compartment of a portable refrigerating unit arranged to be placed upon said cabinet, said unit having an insulated compartment for the freezing of liquids, a brine tank substantially filling said last-named compartment and providing a chamber for the liquids to be frozen, refrigerating apparatus of the closed cycle type on said unit including an evaporator element within said tank and lining said chamber, and detachable means for connecting said tank to said container and arranged to effect circulation of the brine through said container so as to extract heat from said cabinet compartment.

5. A portable refrigerating unit arranged to be placed upon or above a refrigerator cabinet, said unit having two compartments, one of which has insulated walls, a brine tank in said insulated compartment, an evaporator element in thermal contact with said tank, apparatus in said other compartment forming with said element a closed cycle refrigerating system, and vertically spaced detachable connections from said brine tank to permit convenient attachment to and detachment from a container in the cabinet whereby the brine in said tank may be utilized to produce a refrigerating effect in said cabinet.

6. A portable refrigerating unit arranged to be placed upon or above a refrigerator cabinet, said unit having two compartments, one of which has insulated walls, a brine tank in said insulated compartment providing a chamber into which receptacles containing liquid to be frozen may be inserted, an evaporator element in thermal contact with said tank, apparautus in said other compartment forming with said element a closed cycle refrigerating system, and vertically spaced detachable connections from said brine tank to permit convenient attachment to and detachment from a container in the cabinet whereby the brine in said tank may be utilized to produce a refrigerating effect in said cabinet.

Signed by me at New York, in the county of New York, and State of New York this 27th day of September, 1926.

IRA L. NICKERSON.

CERTIFICATE OF CORRECTION.

Patent No. 1,818,348.   Granted August 11, 1931, to

IRA L. NICKERSON.

It is hereby certified that error appears in the printed specification of the above numbered patent requiring correction as follows: Page 2, line 122, claim 1, for "distributing" read disturbing; and that the said Letters Patent should be read with this correction therein that the same may conform to the record of the case in the Patent Office.

Signed and sealed this 6th day of October, A. D. 1931.

(Seal)

M. J. Moore,
Acting Commissioner of Patents.